US012126963B2

(12) United States Patent
Freund et al.

(10) Patent No.: US 12,126,963 B2
(45) Date of Patent: Oct. 22, 2024

(54) VEHICLE ASSISTIVE HEARING

(71) Applicant: Panasonic Automotive Systems Company of America, Division of Panasonic Corporation of North America, Peachtree City, GA (US)

(72) Inventors: Katherine Jennette Freund, Livonia, MI (US); Edo Omanovic, Livonia, MI (US)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 112 days.

(21) Appl. No.: 17/551,906

(22) Filed: Dec. 15, 2021

(65) Prior Publication Data

US 2022/0210584 A1    Jun. 30, 2022

Related U.S. Application Data

(60) Provisional application No. 63/132,840, filed on Dec. 31, 2020.

(51) Int. Cl.
*H04R 25/00* (2006.01)
*G06F 3/16* (2006.01)
*H04R 1/40* (2006.01)
*H04W 4/80* (2018.01)
*H04W 12/50* (2021.01)

(52) U.S. Cl.
CPC .......... *H04R 25/554* (2013.01); *G06F 3/165* (2013.01); *H04R 1/406* (2013.01); *H04W 4/80* (2018.02); *H04W 12/50* (2021.01); *H04R 2225/41* (2013.01); *H04R 2225/55* (2013.01); *H04R 2499/13* (2013.01)

(58) Field of Classification Search
CPC .. H04R 25/554; H04R 1/406; H04R 2225/41; H04R 2225/55; H04R 2499/13; H04R 25/00; H04R 1/40; G06F 3/165; H04W 4/80; H04W 12/50; H04W 4/48; H04W 4/90

See application file for complete search history.

(56) References Cited

U.S. PATENT DOCUMENTS

| | | | |
|---|---|---|---|
| 2006/0023900 A1* | 2/2006 | Erhart | H04S 1/002 381/119 |
| 2008/0032663 A1* | 2/2008 | Doyle | H04R 5/04 455/345 |
| 2009/0125311 A1* | 5/2009 | Haulick | B60R 16/0373 704/275 |
| 2019/0238981 A1* | 8/2019 | Harris | H04R 5/04 |

* cited by examiner

*Primary Examiner* — Yosef K Laekemariam
(74) *Attorney, Agent, or Firm* — Laurence S. Roach, Esq.

(57) ABSTRACT

Examples of the present disclosure relate to a method, computer-readable medium, and system for vehicle assistive hearing. An example may include transmitting an assistive listening device pairing signal into a vehicle. The method may further include identifying a plurality of digital audio sources in the vehicle, wherein at least one of the audio sources is a vehicle alert system for the vehicle. In an example, the method may categorize the priority of the plurality of digital audio sources. In an example, the method may generate a stream of audio from the plurality of digital audio sources with volume adjusted for each audio source according to the priority of the digital audio source. The method may transmit the stream of audio for a paired assistive listening device.

20 Claims, 6 Drawing Sheets

VEHICLE ASSISTIVE HEARING

CROSS-REFERENCED TO RELATED APPLICATIONS

This application claims the benefit of U.S. Provisional Application No. 63/132,840, filed on Dec. 31, 2020, the disclosure of which is hereby incorporated by reference in its entirety for all purposes.

FIELD OF THE INVENTION

The present disclosure generally relates to a method, system, and device for providing audio to hearing aid users in a vehicle. More specifically, the present disclosure relates to a communication system for transmitting a variety of audio sources to a hearing aid system in a vehicle.

BACKGROUND

This section is intended to introduce the reader to various aspects of art, which may be related to various aspects of the present disclosure, which are described and/or claimed below. This discussion is believed to be helpful in providing the reader with background information to facilitate a better understanding of the various aspects of the present disclosure. Accordingly, it can be understood that these statements are to be read in this light, and not as admissions of prior art.

A vehicle may use audio for entertainment and for important indications for safety. In an example, a vehicle may beep to indicate increasing proximity to another object when parking. A vehicle may provide an audio alert to indicate that a turn signal or other light signal is activated. In an example, a vehicle may provide audio entertainment by radio, streaming of music, or by playback of audio files received from user devices in the vehicle.

SUMMARY

Generally, the present techniques relate to a method, computer-readable medium, and system for vehicle assistive hearing. An example may include transmitting an assistive listening device pairing signal into a vehicle. The method may further include identifying a number of digital audio sources in the vehicle, wherein at least one of the audio sources is a vehicle alert system for the vehicle. In an example, the method may categorize the priority of the number of digital audio sources. In an example, the method may generate a stream of audio from the number of digital audio sources with volume adjusted for each audio source according to the priority of the digital audio source. The method may transmit the stream of audio for a paired assistive listening device.

The present techniques further include a computer-readable medium used for vehicle assistive hearing. An example may include instructions to be executed on a processor for transmitting an assistive listening device pairing signal into a vehicle. The computer-readable medium may include instructions to be executed on a processor for identifying a number of digital audio sources in the vehicle, wherein at least one of the audio sources is a vehicle alert system for the vehicle. In an example, the computer-readable medium may include instructions to be executed on a processor for categorizing the priority of the number of digital audio sources. In an example, the computer-readable medium may include instructions to be executed on a processor for generating a stream of audio from the number of digital audio sources with volume adjusted for each audio source according to the priority of the digital audio source. The computer-readable medium may include instructions to be executed on a processor for transmitting the stream of audio for a paired assistive listening device.

The present techniques also include a system for vehicle assistive hearing. The system includes a number of digital audio sources in a vehicle to generate audio wherein at least one of the audio sources is a vehicle alert system for the vehicle. In an example, the system may also include an audio streamer in the infotainment control unit of a vehicle creates a stream of audio from the number of digital audio sources with volume adjusted for each audio source according to the priority of the digital audio source, where the audio streamer is to transmit the stream of audio for an assistive listening device

BRIEF DESCRIPTION OF THE DRAWINGS

The above-mentioned and other features and advantages of the present disclosure, and the manner of attaining them, may become apparent and be better understood by reference to the following description of one example of the disclosure in conjunction with the accompanying drawings, where.

Figure 1:
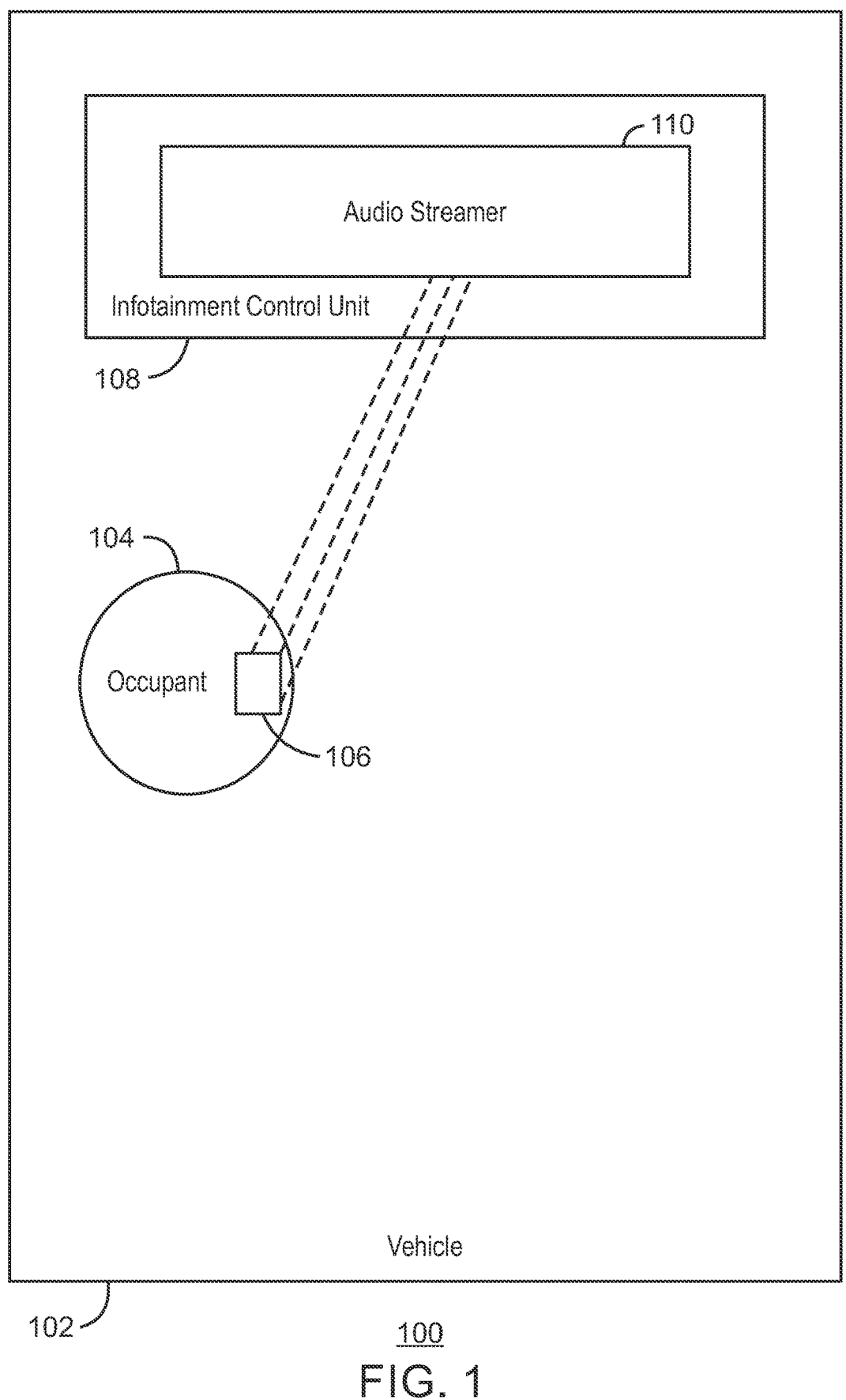
FIG. 1 is a block diagram of an example system for hearing aid communication in a vehicle.

Correlating reference characters indicate correlating parts throughout the several views. The exemplifications set out herein illustrate examples of the disclosure, in one form, and such exemplifications are not to be construed as limiting in any manner the scope of the disclosure.

DETAILED DESCRIPTION OF EXAMPLES

One or more specific examples of the present disclosure are described below. In an effort to provide a concise description of these examples, not all features of an actual implementation are described in the specification. It can be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it can be appreciated that such a development effort might be complex and time consuming, and is a routine undertaking of design, fabrication, and manufacture for those of ordinary skill having the benefit of this disclosure.

The in-vehicle infotainment system of a vehicle may manage a number of audio sources for output into the vehicle. The generation of a stream for broadcast can include broadcast to occupants of the vehicle including to occupant devices such as hearing aids or other hearing assistive devices such as implants. The broadcasting of audio can be via wireless transmission technology such as Bluetooth a registered US trademark of the Bluetooth Special Interest Group, by wireless internet communications, or by other wireless communication protocols and techniques.

The audio generated for streaming can be generated in the in-vehicle infotainment system and may include a number of audio sources including navigation prompts, advanced driver assistance systems (ADAS) chimes, hands free telephony (HFT), or electronic calls available through a user device or from data managed in the vehicle, in-car communication (ICC) systems, music, ambient audio, and other audio managed or obtained in the vehicle. The broadcast of this audio to occupants may increase the awareness and intelligibility of audio traditionally played by in-vehicle speakers. An artificial broadcast could additionally include environment sounds from around the vehicle including car horns and ambulance sirens. In an example, the present techniques may enable the streaming of ADAS alerts to a Bluetooth earpiece even if other vehicle speakers may have been compromised, further increasing functional safety of the vehicle for occupants. As used herein, occupants can include drivers and passengers of a vehicle.

FIG. 1 is a block diagram of an example system 100 for hearing aid communication in a vehicle. A vehicle 102 can include an automobile or any mode of transportation suitable for transporting an occupant 104 or a number of occupants. The occupant 104 may be a driver of a vehicle or a passenger. The occupant may also have difficulty hearing and may use an assistive listening device 106. As used herein an assistive listening device 106 can refer to an amplifier, hearing aid, cochlear implant, bone-anchored hearing system, or other electronically assistive personal technology for assisting those with difficulty hearing.

The vehicle also contains an infotainment control unit 108. The infotainment control unit 108 may control the data displayed or projected by the vehicle. In an example, the infotainment control unit 108 can play music or video from the speakers or a display located inside the vehicle 102. The infotainment control unit 108 may also pair with a user device in a vehicle and in some cases may stream audio, navigation, call, or video data from the user device to be played or projected inside the vehicle 102. In an example, the infotainment control unit 108 may also manage alerts to be displayed by the vehicle to the occupant 104 via a display in the vehicle 102 or by audio cues. However, the present techniques enable a person with hearing difficulties to have an audio stream directly provided to their personal assistive device for improved audio quality.

In order to generate an audio stream for the assistive listening device 106 of the occupant 104, the infotainment control unit 108 makes use of an audio streamer 110. As used herein, the audio streamer generates an audio stream that may be directly broadcast to the assistive listening device 106 using wireless technology. As used herein, the audio streamer 110 may have a paired connection with the assistive listening device 106 via device to device communication protocols. The audio streamer 110 may be broadcasting an audio stream of the audio of the vehicle 102 that may be detected directly by a user of assistive listening device 106. The audio streamer 110 may also be broadcasting an audio stream using cellular data transmission technology or by wireless internet communication technology.

In an example, the assistive listening device 106 may provide an indication to the audio streamer 110 in the infotainment control unit 108 to indicate that it is an assistive listening device 106. In response to receiving an assistive device indication from the assistive listening device 106, the infotainment control unit 108 may instruct the audio streamer to generate an audio stream and provide the audio stream to the assistive listening device 106. In an example, the assistive listening device 106 may initiate the pairing or another communication access initiation with the infotainment control unit 108. In an example, the infotainment control unit 108 may initiate the pairing or another communication access initiation with the assistive listening device 106.

Providing an audio stream to an assistive listening device 106 includes not only identification of the assistive listening device 106 and establishment of a communications channel, but additionally may include a continuous generation of a single audio stream distinct from other audio streams generated by the infotainment control unit 108.

Figure 2:
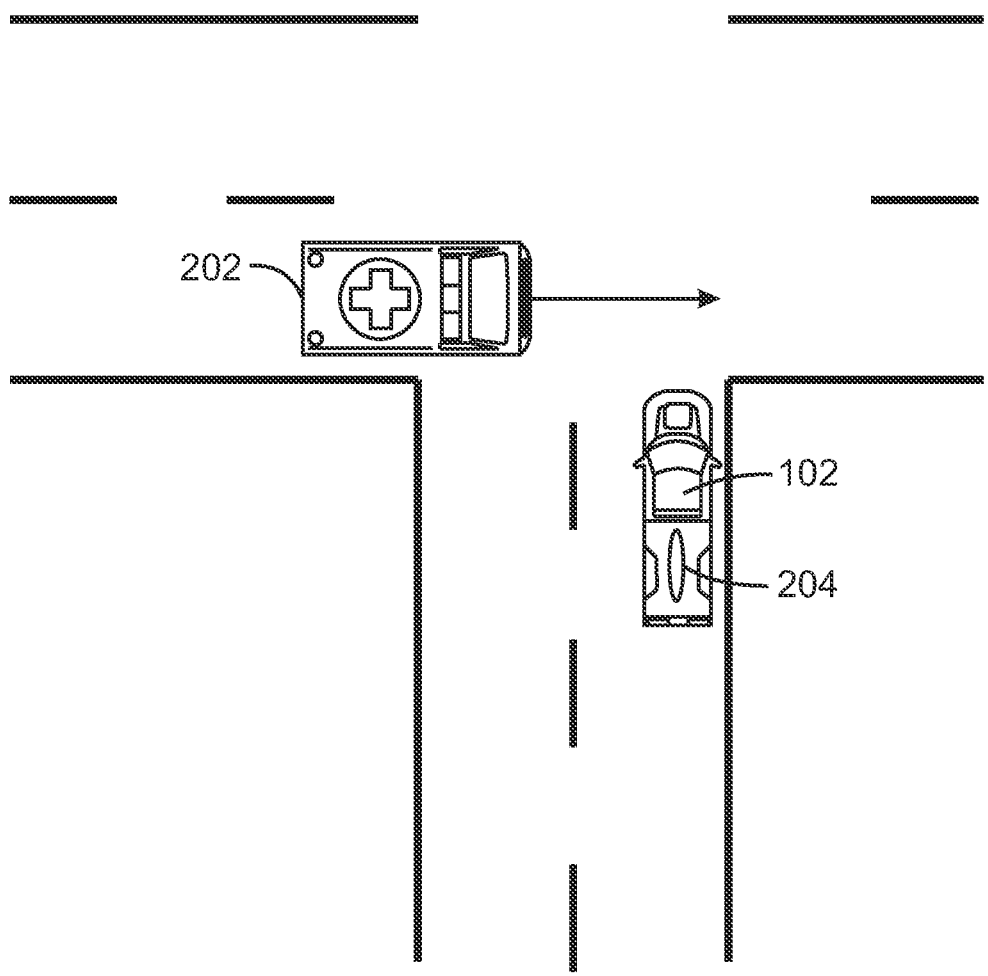
FIG. 2 is a schematic diagram representing an example vehicle using vehicle assistive hearing techniques.

FIG. 2 is a schematic diagram representing an example vehicle using vehicle assistive hearing techniques 200. Like numbered items are as described with respect to FIG. 1.

The driver of the vehicle 102 may be hearing impaired and may not hear an emergency vehicle 202 approaching from an intersecting road. The vehicle 102 may make use of vehicle assistive hearing techniques that provide an audio stream to an occupant through an assistive listening device 106. In an example, the vehicle 102 may include a microphone 204 to pick up sounds outside the vehicle 102. In an example, the sounds can include alerts from the approaching emergency vehicle 202 such as a siren. In an example, the microphone 204 may be replaced or further include another means of detection such as an antenna to pick up an emergency signal transmitted by an emergency vehicle.

In an example, the microphone 204 may be replaced by, or further include, a light detector to be able to sense an approaching emergency vehicle by a detection of a flashing light pattern consistent with an emergency vehicle 202. In response to a detection of an approaching emergency vehicle, whether through sound or other detection method, the vehicle 102 may provide an audio stream that includes sounds that may warn an occupant of the approaching emergency vehicle 202. In response, the occupant may apply the brakes in their vehicle, move to the side of the road, or take another appropriate action.

Figure 3:
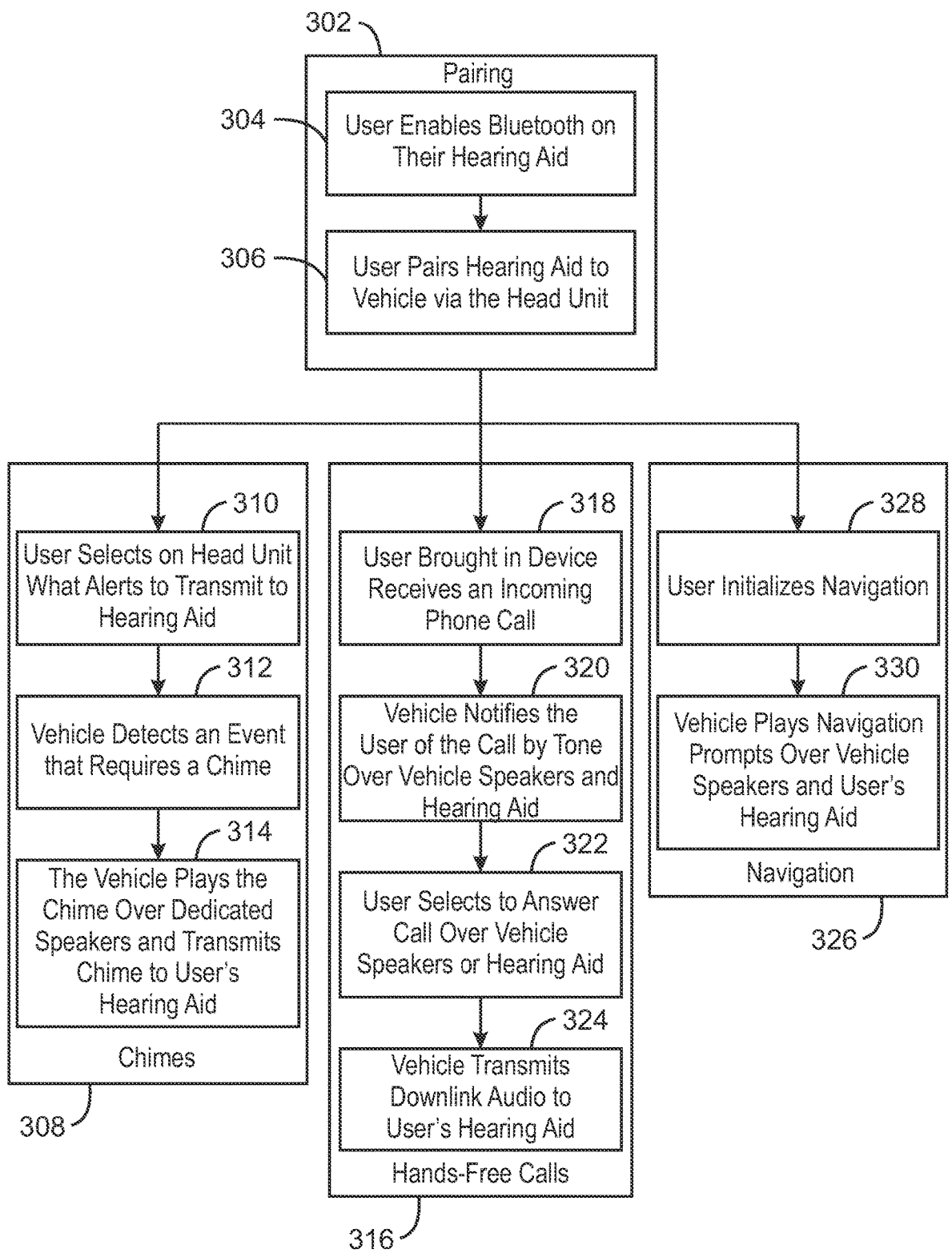
FIG. 3 is a schematic diagram showing some of the processes and functionality of an assistive listening device in a vehicle.

FIG. 3 is a schematic diagram showing some of the processes and functionality of an assistive listening device 106 in a vehicle 300. While arrows are shown as a way of indicating a general flow of a potential sequence, these arrows provide a general understanding of order and intermediate or non-linear execution of these functions may also occur with an assistive listening device 106.

During pairing 302, a user may enable or power on a wireless communication in their assistive listening device 106 at block 304. In an example, the wireless communication may be the Bluetooth communication protocol. Using controls on the assistive listening device 106 or the vehicle 102, a user may pair the assistive listening device 106 to the vehicle 102 in block 306. Once an assistive listening device 106 is paired with the vehicle 102, a number of communications an interactions may occur.

In an example, chimes 308 may be provided to a user. The chimes may be mandatory chimes related to safe operation of a vehicle such as a chime indicating a door not being securely closed, a seat belt not being fastened, or an engine overheating. At block 310, a user may select on the head unit of a vehicle 102, which alerts that the user would like the vehicle to transmit to the paired assistive listening device 106 of the user. In an example, the selection may be made on a touch screen display in the head unit of the vehicle. Selections of chimes to transmit to the user may also be made by commands received at the assistive listening device

106 by physical interaction with a button on the assistive listening device 106 or by vocal commands to the assistive listening device 106 or the vehicle 102. In an example, some chimes may be required to be broadcast as part of any audio stream based on local laws, in which case those chimes would not be removable.

At block 312, a vehicle 102 detects a condition that would initiate a chime. In response to this condition, at block 314, the vehicle 102 plays the chime corresponding to the event over the assistive listening device 106 of the user of the vehicle 102. In an example, the vehicle settings may enable for playback of the chimes on both the assistive listening device 106 and the speakers installed in the vehicle itself.

At block 316, a paired assistive listening device 106 may be used to make hands-free calls using the vehicle 102. At block 318, a user brought-in device, such as a cell phone or tablet, may receive an incoming phone call. In an example, the user brought-in device may already be paired with the vehicle and may provide functionality such as audio calls or access to a microphone and speaker through the vehicle. In an example, the vehicle 102 may already have access to user accounts that have call functionality thereby functionally bringing-in a device that is able to make calls within the phone for a specific user. In an example, calls may be audio calls, video calls, calls provided through a social media application, conference calls, or a call made using cell data or through digital data transmission protocols.

At block 320, in response to a call incoming at the user phone, the vehicle notifies the user by a tone to the paired assistive listening device 106. In an example, the notification may also play over the in-vehicle speakers along with the assistive listening device 106. At block 322, the user may choose to answer the call using the preferred option. In an example, the user may make this selection using vocal commands. In an example, the user may make a selection by operation of controls on the vehicle such as buttons or displays. In an example, the user may make a selection by operation of the assistive listening device 106 whether through buttons, voice commands, or other control feature. In response to a user selection, in block 324, the vehicle 102 transmits the downlink audio of the incoming call to the assistive listening device 106 of the user.

At block 326, a paired assistive listening device 106 may be used to receive prompts from the vehicle's navigation system 326. At block 328, a user may initialize a navigation action. In an example, this activation may occur with a voice command, a physical interaction with the vehicle screen, a physical interaction with the assistive listening device 106, or an interaction with another user device such as a phone providing the physical directions. In an example, the user may be connected with their assistive listening device 106 to the vehicle and to the device of the user, such as a smartphone here. At block 330, the vehicle 102 may play navigation prompts and instructions to the assistive listening device 106. In an example, the vehicle may also play navigation prompts and instructions to the speakers installed in the vehicle as well.

Figure 4:
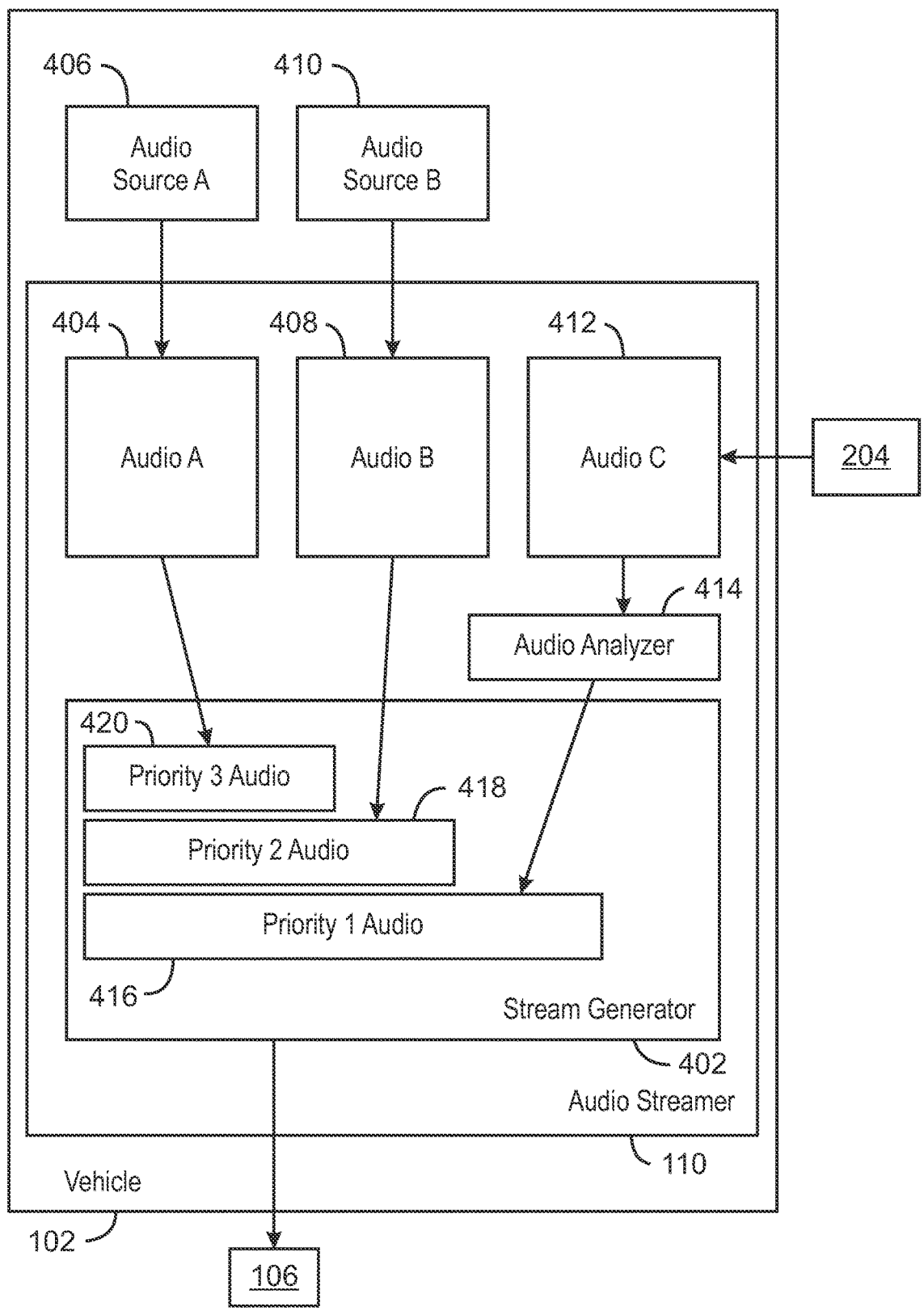
FIG. 4 is a schematic diagram of a stream generation hierarchy and management by the audio streamer.

FIG. 4 is a schematic diagram 400 of a stream generation hierarchy and management by the audio streamer 110. Like numbered items are as described with respect to FIGS. 1 and 2.

An audio streamer 110 may provide a single audio stream to an assistive listening device 106 from a number of sources of audio. In order to generate a stream of audio to send to the assistive listening device 106, the audio streamer 110 includes a stream generator 402. The stream generator may merge a number of input audios from a number of audio sources. In an example, an audio A 404 from an audio source A 406 may be received by the stream generator 402. In an example, an audio B 408 from an audio source B 410 may be received by the stream generator 402. In an example, an audio C 412 from a microphone 204 may be received by the stream generator 402. As audio C 412 may have originated outside of the vehicle 102, audio C 412 may pass through additional analysis prior to arriving at the stream generator 402.

Audio C 412 may arrive at an audio analyzer 414 prior to arriving at a stream generator. In an example, this may be useful for determining how relevant or important the sound of audio C 412 is for a user using an assistive listening device 106. The audio detected in a microphone 204 outside the vehicle 102 may be the sound of wind passing by the vehicle or of traffic. In other cases, the sounds detected in a microphone 204 outside of the vehicle may be the sound of a siren for an emergency vehicle.

An audio analyzer 414 may be able to determine from the sound detected whether or not there is a high likelihood of the importance of the sound to the safety of the driver and the surroundings of the vehicle 102. Accordingly, in response to the audio analyzer 414 identifying that audio C 412 is high priority, the audio analyzer 414 may indicate to the stream generator 402 that audio C 412 should be considered priority 1 audio 416.

As used herein, the stream generator 402 may assign priorities to sounds used in a stream where lower numbers indicate a higher priority and lower numbers indicate a lower priority. In the example shown in FIG. 4, audio C is given priority 1 audio 416 status. A high priority may correspond to the stream giving the higher priority audio a higher volume setting relative to the lower priority audio. In FIG. 4, audio B 408 is shown as being considered priority 2 audio 418 and audio A 404 is shown as being considered priority 3 audio 420. In this present configuration, audio C 412 would be given the highest volume in the stream, audio B 408 would be given a medium volume in the stream, and audio A would be given a lower volume or muted status in the stream. An example of sounds that could correspond to each of the presently shown audios and sources could include audio B referring to vehicle generated alerts with audio A referring to music played for entertainment.

These example audios however are examples and many other layers and priorities could be assigned by the stream generator 402. Notably however, the stream generator is able to generate a single stream that includes outside the vehicle audio while prioritizing the most important streams. The priority levels of audio can switch during a drive depending on if the vehicle is parked or driving quickly or if a microphone detects something either unusual or unexpected.

Figure 5:
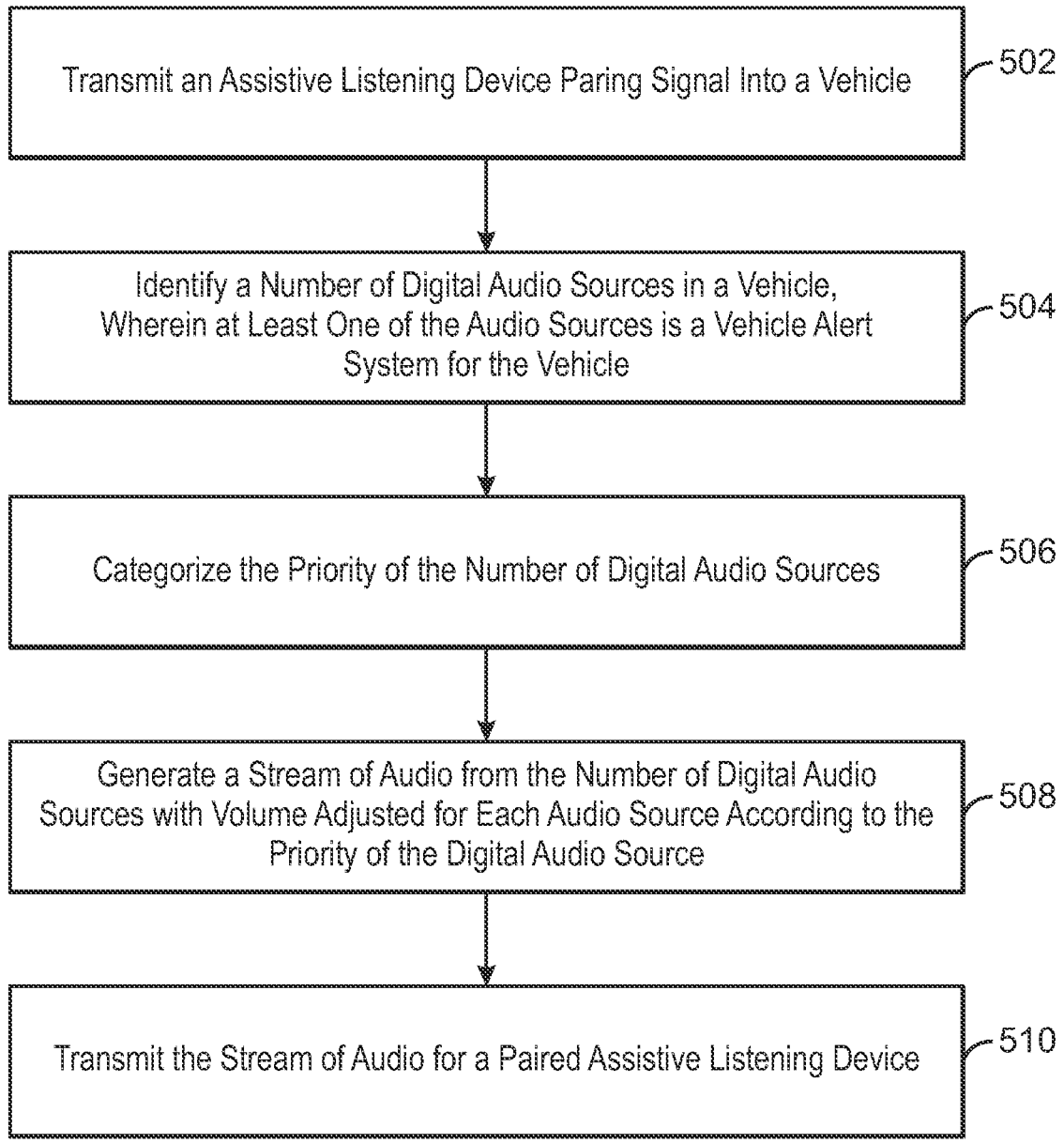
FIG. 5 is a process flow diagram of an example method for vehicle assistive hearing.

FIG. 5 is a process flow diagram of an example method 500 for vehicle assistive hearing. The arrows show a general flow of the process, however additional actions may intercede or compliment the actions shown in the blocks of FIG. 5.

At block 502, the method 500 includes transmitting an assistive listening device pairing signal into a vehicle. In an example, the pairing is via electronic means. At block 504, the method includes identifying a number of digital audio sources in the vehicle, wherein at least one of the audio sources is a vehicle alert system for the vehicle. In an example, the number of digital audio sources includes at least one of a navigation prompt system, advanced driver assistance systems (ADAS) chimes, hands free telephony (HFT), in-car communication (ICC) systems, music streaming services, and ambient audio obtained from a microphone on the outside of the vehicle.

The number of digital audio sources may include audio from a microphone attached to the external surface of the vehicle. In an example, the method may assign a high priority to audio captured by the microphone in response to a determination that the audio includes a siren from an emergency vehicle. In this example, the microphone captures a stereophonic audio where directionality of the stereophonic audio is preserved in the generation of a stream for the transmission for a paired assistive listening device At block 506, the method 500 includes categorizing the priority of the number of digital audio sources. This categorization can include transmitting an indication of an audio priority to an audio streamer along with the audio. In an example, the priority can change over time in relation to the type of audio produced by each audio source. In an example, an external microphone may detect a siren and this audio may be given a highest or second highest priority ranking. When a siren passes, the audio from that same source may be identified as no longer detecting a siren so the priority of this audio may fall to the lowest or second lowest. In an example, when an audio source's audio is silent for a set period of time, the priority of the audio may be lowered.

At block 508, the method 500 includes generating a stream of audio from the number of digital audio sources with volume adjusted for each audio source according to the priority of the digital audio source. In an example, a higher priority corresponds to a relatively higher volume for an audio source in the stream of audio generated. An audio source with a priority level lower than audio from three other audio sources may be muted for the duration that the three other audio sources are providing audio to a stream generator. In an example, a muting threshold may be an adjustable amount by the user to ensure that not too many audio streams are covering up each other to the point where they are unintelligible form one another.

At block 510, the method 500 includes transmitting the stream of audio for a paired assistive listening device. In an example, the transmitter of the assistive listening device pairing signal uses a wireless communication technology. The method 500 may also include transmitting the stream of audio for playback on an audio speaker system installed in the vehicle. The method may also include transmitting the stream of audio for a second paired assistive listening device.

Figure 6:
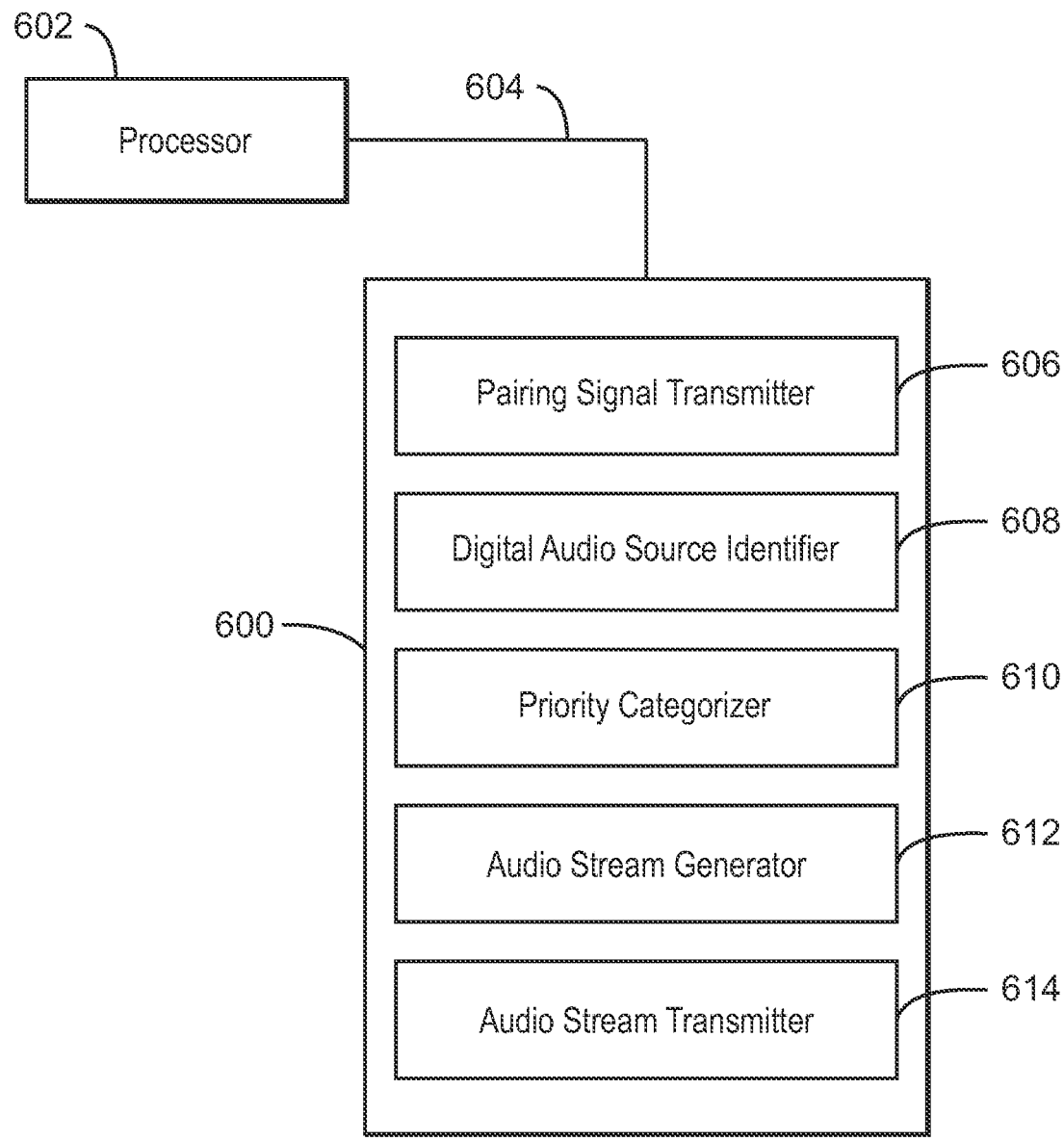
FIG. 6 is a block diagram of an example non-transitory computer-readable storage medium for vehicle assistive hearing.

FIG. 6 is a block diagram of an example non-transitory computer-readable storage medium 600 for vehicle assistive hearing. A processor 602 may execute instructions delivered to it by an electrically and communicatively connected bus 604. The bus 604 may connect the processor to the computer-readable storage medium 600.

The computer-readable storage medium 600 can include a pairing signal transmitter 606 to transmit an assistive listening device pairing signal into a vehicle. In an example, the pairing is via electronic means. The computer-readable storage medium 600 can include a digital audio source identifier 608 to identify a number of digital audio sources in the vehicle, wherein at least one of the audio sources is a vehicle alert system for the vehicle. In an example, the number of digital audio sources includes at least one of a navigation prompt system, advanced driver assistance systems (ADAS) chimes, hands free telephony (HFT), in-car communication (ICC) systems, music streaming services, and ambient audio obtained from a microphone on the outside of the vehicle.

The number of digital audio sources may include audio from a microphone attached to the external surface of the vehicle. In an example, the method may assign a high priority to audio captured by the microphone in response to a determination that the audio includes a siren from an emergency vehicle. In this example, the microphone captures a stereophonic audio where directionality of the stereophonic audio is preserved in the generation of a stream for the transmission for a paired assistive listening device The computer-readable storage medium 600 can include a priority categorizer 610 to categorize the priority of the number of digital audio sources. This categorization can include transmitting an indication of an audio priority to an audio streamer along with the audio. In an example, the priority can change over time in relation to the type of audio produced by each audio source. In an example, an external microphone may detect a siren and this audio may be given a highest or second highest priority ranking. When a siren passes, the audio from that same source may be identified as no longer detecting a siren so the priority of this audio may fall to the lowest or second lowest. In an example, when an audio source's audio is silent for a set period of time, the priority of the audio may be lowered.

The computer-readable storage medium 600 can include an audio stream generator 612 to generate a stream of audio from the number of digital audio sources with volume adjusted for each audio source according to the priority of the digital audio source. In an example, a higher priority corresponds to a relatively higher volume for an audio source in the stream of audio generated. An audio source with a priority level lower than audio from three other audio sources may be muted for the duration that the three other audio sources are providing audio to a stream generator. In an example, a muting threshold may be an adjustable amount by the user to ensure that not too many audio streams are covering up each other to the point where they are unintelligible form one another.

The computer-readable storage medium 600 can include an audio stream transmitter 614 to transmit the stream of audio for a paired assistive listening device. In an example, the transmitter of the assistive listening device pairing signal uses a wireless communication technology. The processor 602 may also execute instructions to transmit the stream of audio for playback on an audio speaker system installed in the vehicle. The processor 602 may also execute instructions to transmit the stream of audio for a second paired assistive listening device.

While the invention may be susceptible to various modifications and alternative forms, specific embodiments have been shown by way of example. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method for vehicle assistive hearing comprising:
transmitting an assistive listening device pairing signal into a vehicle;
identifying a plurality of digital audio sources in the vehicle, wherein at least one of the digital audio sources is a vehicle alert system for the vehicle;
categorizing a priority of the plurality of digital audio sources;
generating a stream of audio from the plurality of digital audio sources with volume adjusted for each digital audio source according to the priority of the digital audio source, wherein two of the plurality of digital audio sources are merged in the stream of audio, wherein a relatively higher volume is given to a digital audio source with a higher priority of the two of the plurality of digital audio sources; and transmitting the stream of audio for a paired assistive listening device.

2. The method of claim 1, wherein the plurality of digital audio sources comprises at least one of a navigation prompt system, advanced driver assistance systems (ADAS) chimes, hands free telephony (HFT), in-car communication (ICC) systems, music streaming services, and ambient audio obtained from a microphone on an outside of the vehicle.

3. The method of claim 1, wherein an audio source with a priority level lower than audio from three other audio sources is muted for a duration that the three other audio sources are providing audio to a stream generator.

4. The method of claim 1, wherein a transmitter of the paired assistive listening device pairing signal uses a wireless communication technology.

5. The method of claim 1, wherein the plurality of digital audio sources comprises audio from a microphone attached to an external surface of the vehicle.

6. The method of claim 5, comprising assigning a high priority to audio captured by the microphone in response to a determination that the audio includes a siren from an emergency vehicle.

7. The method of claim 5, wherein the microphone captures a stereophonic audio where directionality of the stereophonic audio is preserved in generating the stream of audio and transmitting the stream of audio for the paired assistive listening device.

8. The method of claim 1, comprising transmitting the stream of audio for playback on an audio speaker system installed in the vehicle.

9. The method of claim 1, comprising transmitting the stream of audio for a second paired assistive listening device.

10. A non-transitory, computer readable storage device for vehicle assistive hearing comprising instructions that when executed on a processor, cause the processor to:
    transmit an assistive listening device pairing signal into a vehicle;
    identify a plurality of digital audio sources in the vehicle, wherein at least one of the digital audio sources is a vehicle alert system for the vehicle;
    categorize a priority of the plurality of digital audio sources;
    generate a stream of audio from the plurality of digital audio sources with volume adjusted for each digital audio source according to the priority of the digital audio source, wherein two of the plurality of digital audio sources are merged in the stream of audio, wherein a relatively higher volume is given to a digital audio source with a higher priority of the two of the plurality of digital audio sources; and
    transmit the stream of audio for a paired assistive listening device.

11. The storage device of claim 10, wherein the plurality of digital audio sources comprises at least one of a navigation prompt system, advanced driver assistance systems (ADAS) chimes, hands free telephony (HFT), in-car communication (ICC) systems, music streaming services, and ambient audio obtained from a microphone on an outside of the vehicle.

12. The storage device of claim 10, wherein an audio source with a priority level lower than audio from three other audio sources is muted for a duration that the three other audio sources are providing audio to a stream generator.

13. The storage device of claim 10, wherein a transmitter of the assistive listening device pairing signal uses a wireless communication technology.

14. The storage device of claim 10, wherein the plurality of digital audio sources comprises audio from a microphone attached to an external surface of the vehicle.

15. The storage device of claim 14, wherein the microphone captures a stereophonic audio where directionality of the stereophonic audio is preserved in generating the stream of audio and transmitting the stream of audio for the paired assistive listening device.

16. A system for vehicle assistive hearing comprising:
    a plurality of digital audio sources in a vehicle to generate audio wherein at least one of the digital audio sources is a vehicle alert system for the vehicle; and
    an audio streamer in an infotainment control unit of the vehicle to create a stream of audio from the plurality of digital audio sources with volume adjusted for each digital audio source according to a priority of the digital audio source, wherein the audio streamer is to transmit the stream of audio for an assistive listening device, wherein two of the plurality of digital audio sources are merged in the stream of audio, wherein with a relatively higher volume is given to a digital audio source with a higher priority of the two of the plurality of digital audio sources.

17. The system of claim 16, comprising a microphone attached to an outside of the vehicle to capture ambient audio and act as one of the plurality of digital audio sources.

18. The system of claim 16, comprising a stream transmitter to transmit the generated stream to an audio speaker system installed in the vehicle.

19. The method of claim 1, comprising switching a priority level in the plurality of digital audio sources in response to detecting that the vehicle is parked.

20. The method of claim 1, comprising switching a priority level in the plurality of digital audio sources in response to detecting that the vehicle is moving.

* * * * *